United States Patent [19]

Egner-Walter et al.

[11] Patent Number: 5,327,614
[45] Date of Patent: Jul. 12, 1994

[54] WINDSHIELD CLEANING SYSTEM WITH PIPE AND CONDUCTOR IN WIPER SHAFT

[76] Inventors: Bruno Egner-Walter, Kaferflugstr. 43, 7100 Heilbronn; Eberhard Pleib, Glockelsberg 8, 7598 Lauf; Eckhardt Schmid, Heilbronner Str. 62, 7129 Brackenheim, all of Fed. Rep. of Germany

[21] Appl. No.: 613,798
[22] PCT Filed: Mar. 2, 1990
[86] PCT No.: PCT/EP90/00347
§ 371 Date: Jan. 14, 1991
§ 102(e) Date: Jan. 14, 1991
[87] PCT Pub. No.: WO90/10561
PCT Pub. Date: Sep. 20, 1990

[30] Foreign Application Priority Data

Nov. 3, 1989 [DE] Fed. Rep. of Germany ....... 3907968

[51] Int. Cl.$^5$ .................. B60S 1/46; B60S 1/34
[52] U.S. Cl. ................ 15/250.04; 15/250.07; 15/050.05; 15/250.34; 392/480; 219/202; 239/133; 239/135; 239/134; 239/225.1; 239/264
[58] Field of Search ......... 15/250.01–250.09, 15/250.34, 250.36, 250.35; 219/202, 203; 392/480; 239/284.1, 284.2, 133, 134, 135, 261, 264; 439/190–195

[56] References Cited

U.S. PATENT DOCUMENTS

| 696,702 | 4/1902 | Weitz | 439/191 |
|---|---|---|---|
| 1,719,006 | 7/1929 | Fogland | 15/250.08 |
| 1,890,290 | 12/1932 | Hargreaves | 439/194 |
| 3,408,678 | 11/1968 | Linker | 15/250.05 |
| 3,418,676 | 12/1968 | Byczkowski et al. | 15/250.06 |
| 3,587,129 | 6/1971 | Linker | 15/250.06 |

FOREIGN PATENT DOCUMENTS

| 207364 | 1/1987 | European Pat. Off. | 15/250.02 |
|---|---|---|---|
| 284669 | 10/1988 | European Pat. Off. | 15/250.05 |
| 0313083 | 6/1974 | Fed. Rep. of Germany . | |
| 8804624 | 6/1988 | Fed. Rep. of Germany . | |
| 0323817 | 7/1989 | Fed. Rep. of Germany . | |

Primary Examiner—Philip R. Coe
Assistant Examiner—Gary K. Graham
Attorney, Agent, or Firm—Dykema Gossett

[57] ABSTRACT

A windshield cleaning system with a wiper shaft for driving a wiper arm-and-blade assembly is described, which windshield cleaning system comprises an axial bore for forming a washing liquid channel, whereby at least one electric conductor for heating the washing liquid is assigned to the washing liquid channel. Thereby the electric conductor is anchored on a pipe, which is arranged in the bore of the wiper shaft, whereby this pipe extends the end of the wiper shaft by way of at least one end portion and can detachably be connected there with a counter contact piece. Due to the plug connection of the electric conductor an easy assembly is possible.

24 Claims, 2 Drawing Sheets

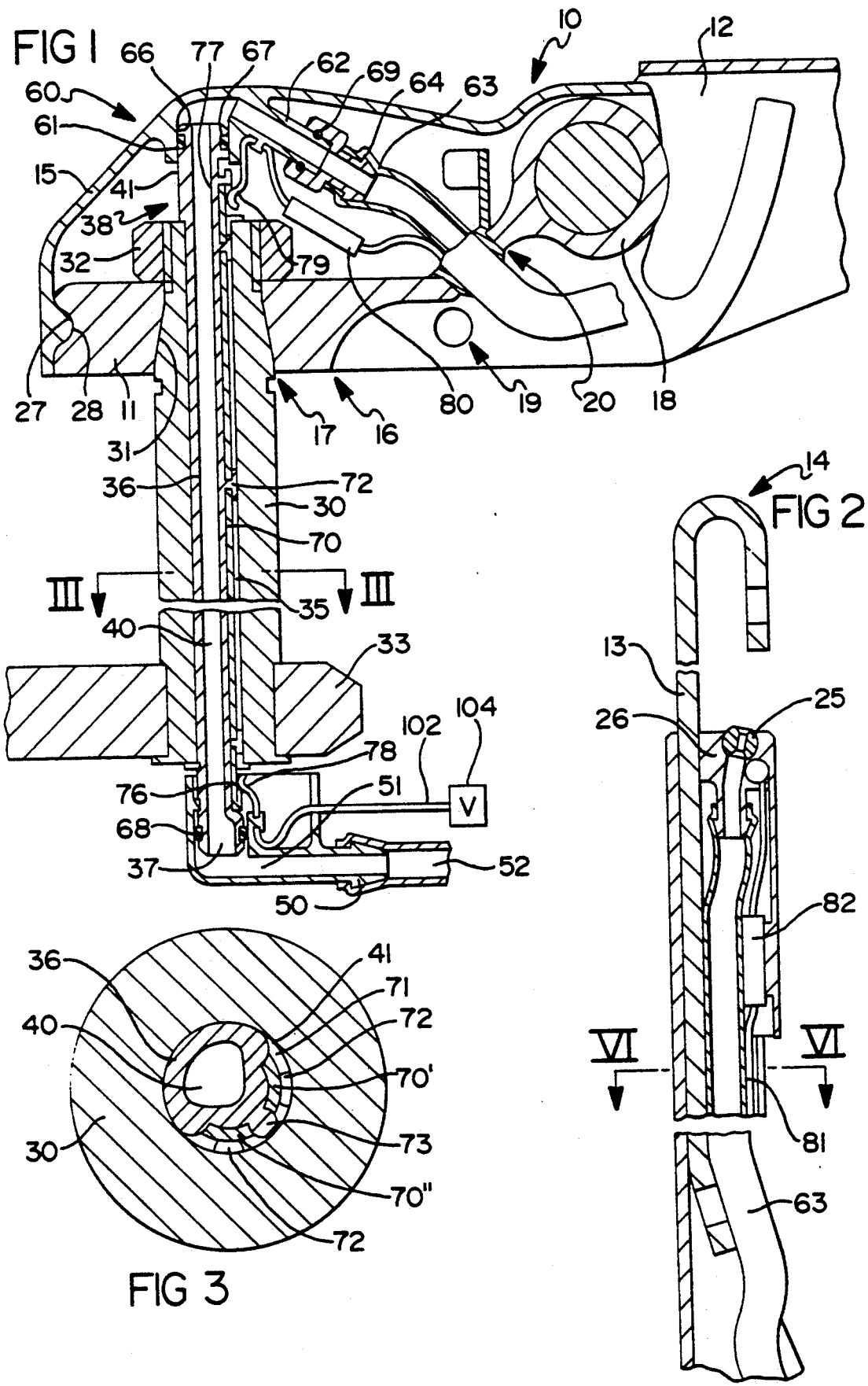

WINDSHIELD CLEANING SYSTEM WITH PIPE AND CONDUCTOR IN WIPER SHAFT

INTRODUCTION

The invention relates to a windshield cleaning system, especially for motor vehicles.

BACKGROUND OF THE INVENTION

Windshield cleaning systems are already known, in which for the purpose of improving the effect of the washing system the washing liquid is supplied to jets which are arranged on the wiper arm-and-blade assembly and move in pendulum motion with it. In such an embodiment known from the AT-PS 3 13 083 the washing liquid is supplied through a bore in a wiper shaft, whereby for heating the washing liquid a resistance wire is inserted into the bore. Thereby resistance wire is loosely embedded into the washing liquid channel formed by the bore in the wiper shaft and consequently is in direct contact with the washing liquid so that the electric conductor must be perfectly isolated. The schematic illustration in this publication indicates that apparently these resistance wires are integrally realized from the voltage source up to the heating elements near the jet. This makes it much more difficult to assemble or dismount the wiper arm belonging to the wiper arm-and-blade assembly to or from the wiper shaft.

BRIEF DESCRIPTION OF THE INVENTION

The object of the present invention is to develop a windshield cleaning system of the sort mentioned at the beginning with a heating device for the washing liquid in such a way that the windshield cleaning system can easily be assembled and afterwards, if necessary, the wiper arm can also easily be exchanged.

Thereby the invention is based on the idea that the connection between the battery and a heating element located on the wiper arm for the jet is separated at certain points and is to be replaced by plug connections. Therefore in the embodiment according to the invention the electric conductor within the bore of the wiper shaft is anchored on a pipe forming the actual washing liquid channel, whereby the pipe extends the ends of the wiper shaft by way of at least one end portion, preferably, however, by way of two end portions. A contact web each connected with the conductor is fixed onto these end portions, by way of which contact web a detachable counter contact piece can be contacted. Thus a wiper shaft has been assigned to its own conductor which can be separated from the other resistance wires or conductors. Thus the wiper system can be assembled in a motor vehicle without any difficulties, for the whole electric circuit can be closed afterwards.

The counter contact piece cooperating with the contact web on the pipe can be fixed onto a separate plug. In order to simplify and to cheapen the construction, however, an embodiment is preferred in which this counter contact piece is fixed onto a member which is needed for forming the washing system anyway. Embodiments are known in which the drive end portion of the pipe projects into a receiver of a tube connecting stud. Thus in such an embodiment the counter contact piece is fixed onto this tube connecting stud, whereby it is taken care that, when connecting the pipe with the tube connecting stud, automatically the separate conductors are also electrically connected.

Embodiments are known in which the other end portion of the pipe projects into a receiver of an intermediate piece, whereby the intermediate piece can integrally immediately be connected with the jet body or is formed in such a way that a tube leading to the jet can be plugged onto it. In such an embodiment the counter contact piece is fixed onto the intermediate piece in such a way that, when assembling the intermediate piece, the electrical connection is automatically provided.

In such windshield cleaning systems the wiper arm must precisely be adjusted before fixing it onto the wiper shaft so that in the parking position the windshield wiper does not project into the windshield in a disturbing manner. This must be taken into consideration when arranging the transitional contacts.

A suitable form of the conductors is fixed onto the pipe within the bore of the wiper shaft in such a way that a precise assembly is possible.

Primarily the present invention refers to embodiments in which the washing liquid is also to be heated in the area of the pipe. However, embodiments are also possible in which the conductors within the pipe only serve for electricity supply for a heating element located on the wiper arm itself. This alternative last mentioned could be useful for rear wiper systems in which the wiper shaft and the drive motor are combined to one unit and thus, the wiper shaft is already heated by the warmth produced when the motor is running, and thus the washing liquid flowing in the bore of the wiper shaft is sufficiently heated.

Principally, the intermediate piece on the driven end of the wiper shaft can be produced as a separate part. However, an embodiment is preferred in which this intermediate piece is integrally formed with the cover cap which is there for covering the connection between the wiper arm and the wiper shaft in most of the wiper arms anyway. Such a formation is of an advantage, of course, even then, when washing liquid is to be supplied to a jet on the wiper arm without heating.

The tube beginning at this intermediate piece and leading to a jet at the front end of the wiper arm can reliably be arranged, the fastening member of the wiper arm is equipped with an aperture for the washing liquid tube. Thus in such an embodiment it can be avoided that the tube is laterally arranged on the fastening member. This solution is of an advantage even in embodiments which cannot be heated.

The invention and advantageous developments thereof are described by means of the embodiments illustrated in the drawings.

BRIEF DESCRIPTION OF THE DRAWINGS

FIG. 1, is a section of a windshield cleaning system in the area of the wiper shaft;

FIG. 2, is a section of an end of the wiper arm;

FIG. 3, is a section taken along the line III—III in FIG. 1;

DETAILED DESCRIPTION OF THE PREFERRED AND ALTERNATIVE EMBODIMENTS

Figure 4:
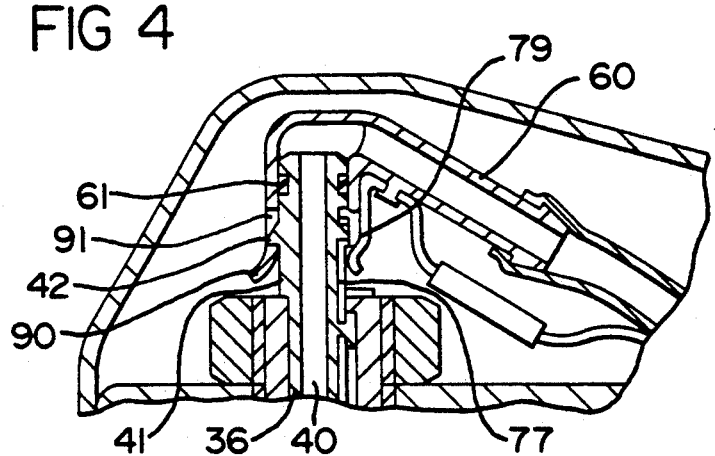
FIG. 4, is a partial section similar to FIG. 1 in another embodiment.

Referring to FIGS. 1 and 2, a wiper arm of a windshield cleaning system is generally designated by 10, which wiper arm, in a known way, includes a fastening member 11, a link member 12, a wiper rod 13 with a hook-like end portion 14 as well as a cover cap 15. The fastening member 11 has a fastening section 16 with an aperture 17 for the wiper shaft generally designated by 30 as well as a bearing section 18, onto which in a known way the link member 12 is swivellably mounted via a link rivet. In a transitional zone 19 between the fastening section 16 and the bearing section 18 the fastening member 11 has an aperture 20, the importance of which will be explained later on.

The wiper shaft generally designated by 30 comprises a knurled section 31 inserted into the aperture 17 in the fastening section 16 of the fastening member 11. By means of a fastening nut 32 the wiper shaft 30 and the wiper arm 10 are non-rotatably connected with each other. At the drive end, wiper shaft 30 is non-rotatably connected with a rocker 33. The wiper shaft 30 is swivellably mounted in a known way in a bearing bush not illustrated any further in the drawing.

Especially FIG. 1 makes clear that wiper shaft 30 comprises a continual bore 35 into which a plastic pipe 36 with a thin wall is inserted. Pipe 36 extends beyond the drive end of the wiper shaft 30 by way of its first end portion 37. Moreover, in the embodiment illustrated in FIG. 1 pipe 36 extends beyond the driven end of the wiper shaft 30 by way of a second end portion 38, that is, it extends the end connected with the wiper arm 10. A washing liquid channel generally designated by 40 is formed by pipe 36, via which washing liquid channel 40 washing liquid is supplied from a reservoir (not illustrated) to a jet 25 which is adjustably held in a jet body 26 that is held stable in form next to the free end of the wiper arm 14 on the wiper rod 13. In the embodiment according to FIG. 1, the washing liquid supply system includes a tube connecting stud 50 with a pot-like receiver 51 for the first end portion 37 of the pipe 36. A tube piece 52 is put over the tube connecting stud 50 radially arranged with respect to the wiper shaft, which tube piece 52 leads, for instance, to the pump of the washing system. Furthermore the washing liquid supply system includes an intermediate piece 60, which in the embodiment according to FIG. 1 is integrally formed with the cover cap 15. This intermediate piece 60 comprises a first stud 61, which is put over the second end portion 38 of the pipe 36. Additionally, intermediate piece 60 comprises a second stud 62 for connecting a tube piece 63 leading to the jet body 26. Thereby in the embodiment according to FIG. 1 a tube connecting intermediate piece 64 plugged onto the second stud 62 stable in form is provided between tube piece 63 and the stud 62. Between the inner surface 66 of the first stud 61 and the circumference 41 of the end portion 38 of the pipe 36, a seal ring 67 is arranged so that after the final assembly of the wiper arm illustrated in FIG. 1 the pipe is connected with intermediate piece 60 in a sealing way so that no liquid can flow out. A stable locking by way of a locking lug 27 on the cover cap 15 and a locking receiver 28 on the fastening member 11 is useful for preventing the pressure of the washing liquid from swivelling the cover cap unintentionally. In such an embodiment it is useful to renounce on a locking between the stud 61 and the end portion 38 of the pipe 36 so that distortions in the cover cap are avoided, which distortions could cause leakage. Of course, a sealing between the tube connecting stud and the other end portion 37 of the pipe is also necessary. For this purpose a seal ring 68 also acting in radial direction is provided. Another seal ring 69 is arranged between the tube connecting intermediate piece 64 and the second stud 62. Thus a washing liquid supply system is provided, which is combined of several parts that can be plugged within each other so that an easy assembly is possible.

FIGS. 1 and 3 illustrate that at least one electric conductor 70 is assigned to the washing liquid channel 40, which electric conductor 70 is anchored on the pipe 36. Thereby a conductor strip punched out of a blank serves as a conductor 70, which conductor strip is fixed in a pocket 71 in the circumference 41 of the pipe 36. Thereby projections 72 extend the circumference 41 of the plastic pipe 36, which projections 72 are warmly deformed and hold these conductor strips 70 on the circumference of the pipe 36 in such a way that contact with the metallic wiper shaft 30 is avoided.

FIG. 3 shows that two conductors 70' and 70", which are isolated against each other by a partition 73, are arranged on the circumference of the pipe 36. However, the invention is not restricted to an embodiment with two conductors because one conductor, namely the ground connection, could also be produced via the metallic wiper shaft and the metallic wiper arm. The conductor strip 70 connects two contact webs 76 and 77 arranged in the form of segments, which contact webs 76 and 77 are fixed on the end portions 37, 38 of the pipe 36 extending the wiper shaft 30. Each of these segment-like contact webs 76, 77 grips the circumference of the respective end portion 37, 38 in a certain angle area in such a way that an electric connection with counter contact pieces 78, 79 is ensured even then, when during the assembly one has to deviate from a certain normal position.

FIG. 1 shows that the counter contact piece 78 is formed as a locking lug fixed onto the tube connecting stud 50. When plugging the tube connecting stud 50 onto the end portion 37 of the pipe 36, also the electric connection between this resilient contact lug 78 and the contact web 76 is automatically to be produced. The same also applies to the other contact point between the resilient lug 79 and the contact web 77, for the contact lug 79 is fixed onto the intermediate piece 60 and after the assembly of the cover cap resiliently lies on the contact web 77. The counter contact piece or the contact lug 78 is soldered with a connecting wire 102 to a voltage source 104 which is not illustrated any further in the drawing. The other contact lug 79 is connected with a cable 81 (FIG. 2) via a plug 80 or also via a soldering connection, which cable 81 leads to a heating element near the jet 25. FIG. 2 makes evident that in the area of the jet body 26 a second plug connection 82 can be provided so that all separate parts, namely the cover cap, the jet body and the wiper shaft comprise an own assigned conductor section so that the separate production and the later assembly are possible without difficulties.

In the embodiment according to FIG. 1 the conductor strips 70 with the contact webs 76, 77 are integrally punched out from a blank and are guided on the circumference 41 of the pipe 36 parallelly to the axis. For improving the heating effect, however, contact strips 70 could also spirally be arranged on the circumference of the pipe. Solutions are also possible in which these conductor strips are injection-moulded into the pipe so that no additional assembly step is needed and there is no danger at all of producing an electric connection to the wiper shaft 30.

Figure 5:
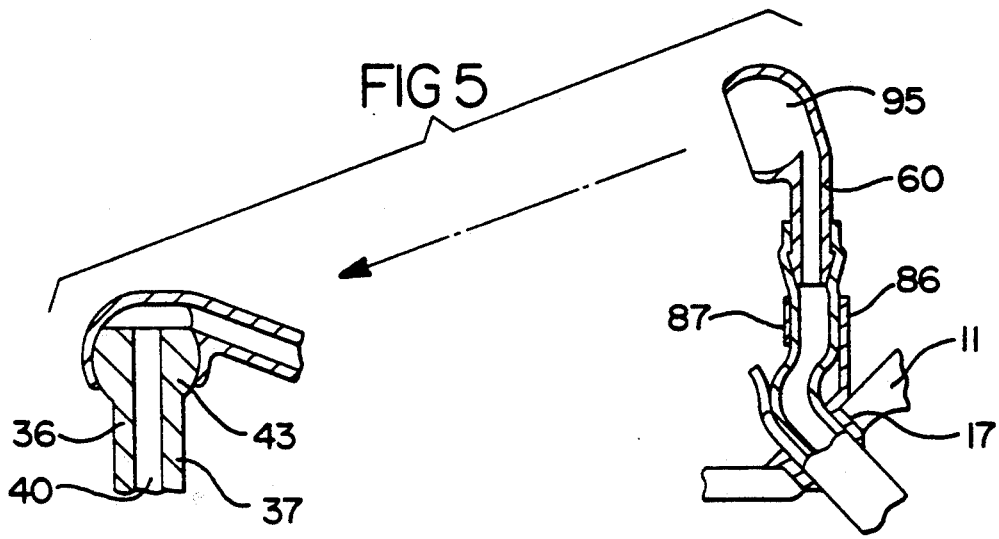
FIG. 5, is an intermediate piece of another embodiment, which intermediate piece can be buttoned onto the end portion of a wiper shaft.

Considering that in the embodiment according to FIG. 1 the intermediate piece 60 is integrally formed with the cover cap 15, FIGS. 4 and 5 illustrate solutions with a separate intermediate piece. Thereby, it must be noted with respect to the embodiment according to FIG. 4 that locking tabs 90 with a locking receiver 91 are formed onto the stud 61, into which locking receiver 91 a locking lug 42 radially extending the circumference 41 of the pipe 36 engages. Thereby, the locking device with the locking receiver 91 and the locking lug 42 can be formed in such a way that the intermediate piece 60 can be swivelled to a certain extent in relation to the pipe 36. This is useful because most of the time the position of the wiper arm 10 can only be fixed after the assembly of the whole windshield cleaning system into a motor vehicle.

In FIG. 5 an embodiment is illustrated in which the end portion 37 ends in a ball-like locking body 43, which can engage into a respective ball-like locking receiver 95 on the intermediate piece 60. In this embodiment according to FIG. 5 the intermediate piece 60 is also formed as a separate component which is not connected with the cover cap 15.

Figure 6:
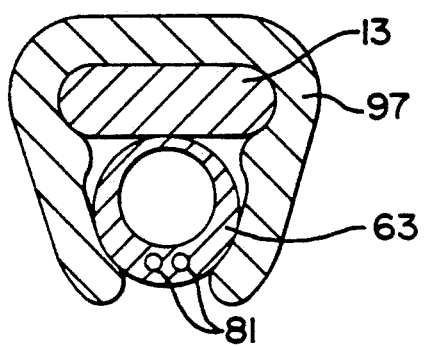
FIG. 6, is a section taken along the line VI—VI in FIG. 2.
Figure 7:
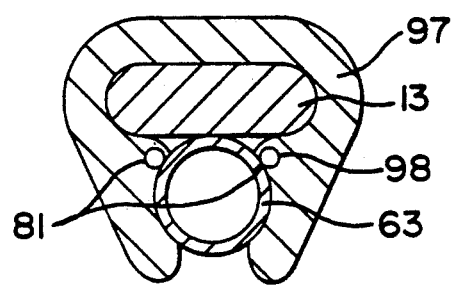
FIG. 7, is a section similar to FIG. 6 in another embodiment.

FIG. 6 shows that a channel-like holding element 97 gripping the tube piece 63 like tongs locked onto the wiper rod 13. Thereby in the embodiment according to FIG. 6 cables 81 are immediately integrated into tube piece 63. In the embodiment according to FIG. 7, however, cables 81 are held in elongated grooves 98 on holding element 97 directly next to the tube piece 63.

In context with FIG. 5, a holding element 86 is formed into the aperture 17 in the fastening member 11, which holding element 86 comprises locking tabs 87 between which the tube piece 63 can be locked. By means of the holding element the intermediate piece 60 is to be held in a pre-assembly position which makes it easy to put the fastening member 11 onto the wiper shaft 30 and to tighten the fastening nut without difficulties.

A conductor is assigned to the washing liquid channel within the wiper shaft, which conductor due to its dimension can simultaneously serve as a heating element, but also as a voltage supply for another heating element next to the jet. Alternatively, an embodiment is also possible, in which the conductor within the wiper shaft only serves as electricity supply, but not simultaneously as a heating element. For forming the whole washing liquid supply system there are several elements which can be plugged into each other so that an easy assembly is possible and separate parts, if necessary, can also be exchanged. The electric system, too, consists of several separate components which are detachably connected with each other. Thus the assembly of the whole system is not negatively affected. Thereby in the preferred embodiment the separate electric conductors and the elements transporting water are combined each in such a way that, when assembling, for instance the intermediate piece, simultaneously also the electric connection is produced. Thereby it must be noted that in the drawing the preferred embodiment is illustrated, but that also embodiments are possible, in which a soldering connection is possible instead of a plug connection between two conductor sections.

What is claimed is:

1. A windshield cleaning system for delivering a washing liquid supplied by a washing liquid supply tube to a windshield of a vehicle so that the windshield may be cleaned by the washing liquid being wiped over the windshield, the windshield cleaning system comprising:
   a jet for spraying the washing liquid onto the windshield;
   a rotatably mounted shaft with a drive end and a driven end, the shaft having an axial bore, the bore adapted to channel washing liquid passing from the washing liquid supply tube through the bore from the drive end to the driven end of the shaft;
   a wiper arm for wiping the washing liquid over the windshield, the wiper arm connected to the driven end of the shaft;
   an intermediate piece disposed at the driven end of the shaft for diverting the washing liquid received from the bore of the shaft to the jet, the jet being connected to the intermediate piece;
   a heating element disposed on the wiper arm for warming the washing liquid at the jet;
   a voltage source connected to the heating element for exciting the heating element;
   at lest one electric conductor for heating the washing liquid, the at least one electric conductor disposed within the bore;
   a pipe disposed within the bore, the at least one electric conductor carried by the pipe, the pipe extending beyond one of the ends of the shaft to define a first end portion of the pipe;
   at least one contact web connected to the conductor and attached to the at least one end portion for detachable connection to a counter contact piece; and
   a first counter contact piece detachably electrically connected to the voltage source and the at least one contact web.

2. A windshield cleaning system according to claim 1, wherein the first end portion extends from the drive end of the wiper shaft, wherein the windshield cleaning system further comprises a tube connecting stud detachably plugged onto the first end portion, and wherein the first counter contact piece is fixed onto the tube connecting stud.

3. A windshield cleaning system according to claim 2, wherein the pipe includes a second end portion that extends from the driven end of the wiper shaft, wherein the intermediate piece is detachably plugged into the second end portion, and wherein a second counter contact piece is fixed onto the intermediate piece.

4. A windshield cleaning system according to claim 3, wherein the at least one contact web is formed as a cylindrical segment and is attached to the circumference of the pipe and wherein the first counter contact piece is a contact lug resiliently contacting the contact web for electrical connection therewith.

5. A windshield cleaning system according to claim 4, wherein the system further comprises locking devices for locking the tube connecting stud and the intermediate piece with the respective first and second end portions of the pipe, the locking devices formed in such a way that contact webs contact the respective first and second counter contact pieces when the connecting stud and the intermediate piece are locked with the respective first and second end portions of the pipe.

6. A windshield cleaning system according to claim 5, wherein the locking devices permit limited twisting of the tube connecting stud and of the intermediate piece in relation to the pipe.

7. A windshield cleaning system according to claim 1, wherein the pipe is elongated and has an axial pocket extending substantially the length of pipe and wherein the conductor and the contact web are an integral conductor strip punched out of a blank and fixed in the pocket.

8. A windshield cleaning system according to claim 7, wherein the conductor strip is elongated and fixed into the pipe parallel to the pipe.

9. A windshield cleaning system according to claim 1, wherein the at least one electric conductor conveys electricity to the heating element.

10. A windshield cleaning system according to claim 1, wherein the at least one electric conductor is a heating element for heating the washing liquid disposed within the bore.

11. A windshield cleaning system according to claim 1, wherein a cover cap is disposed on the wiper arm, wherein the system further comprises a tube piece for conveying washing liquid from the intermediate piece toward the jet, and wherein the intermediate piece is integrally formed with the cover cap and comprises a first and second stud projecting therefrom, the studs being angularly disposed with respect to each other, the first stud being substantially hollow with an inner surface and detachably receiving the first end portion of the pipe and the second stud connecting to the tube piece.

12. A windshield cleaning system according to claim 11, wherein a tube connecting intermediate piece is plugged onto the second stud, the tube connecting intermediate piece connecting the second stud with the tube piece.

13. A windshield cleaning system according to claim 11, wherein a seal ring is provided between the inner surface of the first stud and the outer circumference of the first end portion of the pipe.

14. A windshield cleaning system according to claim 11, wherein at least one locking tab with a locking receiver is formed onto the first stud, into which locking receiver a locking lug extending from the outer circumference of the first end portion of the pipe engages.

15. A windshield cleaning system according to claim 1, wherein the first end portion of the pipe is formed as a ball-like locking body fittingly engaging into a respective locking receiver on the intermediate place.

16. A windshield cleaning system, according to claim 1, wherein the wiper arm comprises a fastening section at the driven end of the shaft, a bearing section, and a transitional zone between the bearing section and the fastening section, said transitional zone including an aperture therein for a washing liquid tube to pass therethrough.

17. A windshield cleaning system according to claim 16, wherein locking tabs are anchored in the aperture, the locking tabs having a holding element for holding a tube piece in a pre-assembly position.

18. A windshield cleaning system according to claim 17, wherein the tube piece includes integrated electric cables integral therewith, said cables for heating said tube piece.

19. A windshield cleaning system according to claim 17, wherein the wiper arm includes a wiper rod coupled with the fastening section and electric cables for heating the tube piece, the electric cables being adjacent to the tube piece, and wherein a tube guiding element is clipped onto the wiper rod, the tube guiding element comprising an elongated groove for holding the electric cables.

20. A windshield cleaning system for delivering a washing liquid, supplied by a washing liquid supply reservoir and warmed by an electric current provided by a voltage supply, to an intermediate piece and then to a jet for spraying the washing liquid onto a windshield of a vehicle so that the windshield may be cleaned by the action of a wiper arm assembly wiping the washing liquid over the windshield, the windshield cleaning system comprising:

a shaft including a rotatably mounted drive end, a driven end, and an axial bore, the wiper arm assembly at the driven end of the shaft;

a washing fluid supply pipe disposed within said bore, said pipe including a first end portion adjacent the drive end of said shaft, the first end portion adapted for communication with said washing fluid supply reservoir and said pipe including a second end portion adjacent the driven end of said shaft, the second end portion adapted for communication with said jet through said intermediate piece;

at least one electrical conductor insulatively carried by said pipe;

at least one contact web attached to one of said end portions and electrically connected to said conductor; and means electrically connected to said contact web for establishing a flow path for electrical current through said electrical conductor for any momentary position of rotation of said shaft while said shaft drives said wiper arm assembly.

21. A windshield cleaning system according to claim 20, wherein said electrically connected means comprises a contact piece resiliently biased against said contact web.

22. A windshield cleaning system according to claim 20, wherein at least one of said end portions extends axially beyond said shaft.

23. A windshield cleaning system according to claim 20, wherein said supply pipe is constructed of electrically insulating material.

24. A windshield cleaning system according to claim 20, wherein at least a portion of said electrical conductor has a predetermined characteristic finite electrical resistance such that a flow of electrical current therethrough will liberate heat.

* * * * *